Dec. 13, 1927.
C. C. KELLOGG ET AL
1,652,280
GRAIN SHOCKER
Filed Oct. 22, 1923
7 Sheets-Sheet 2
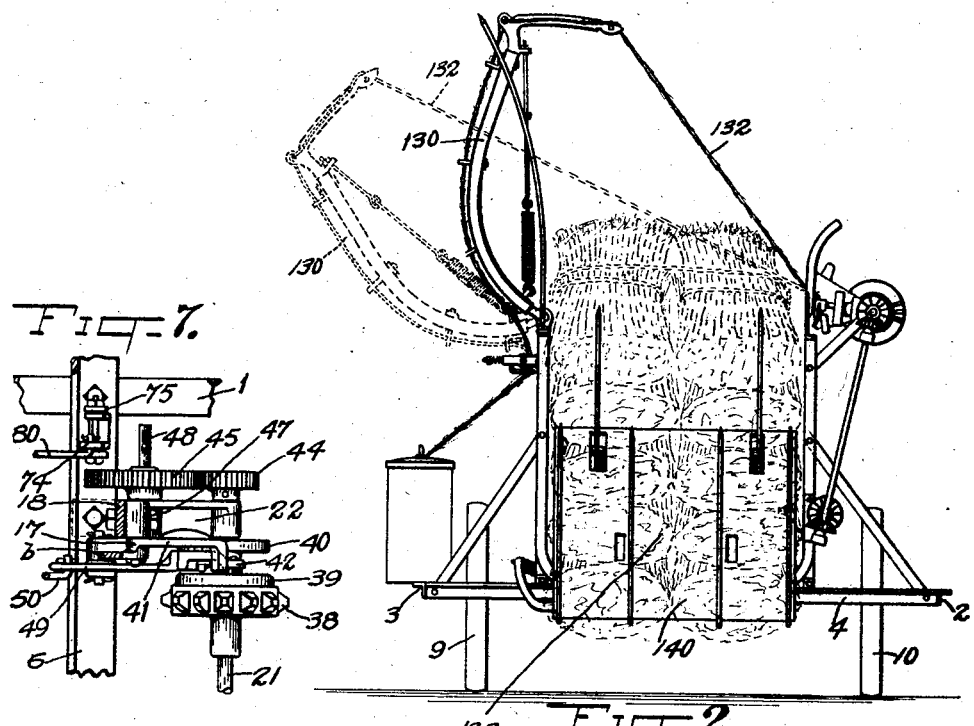
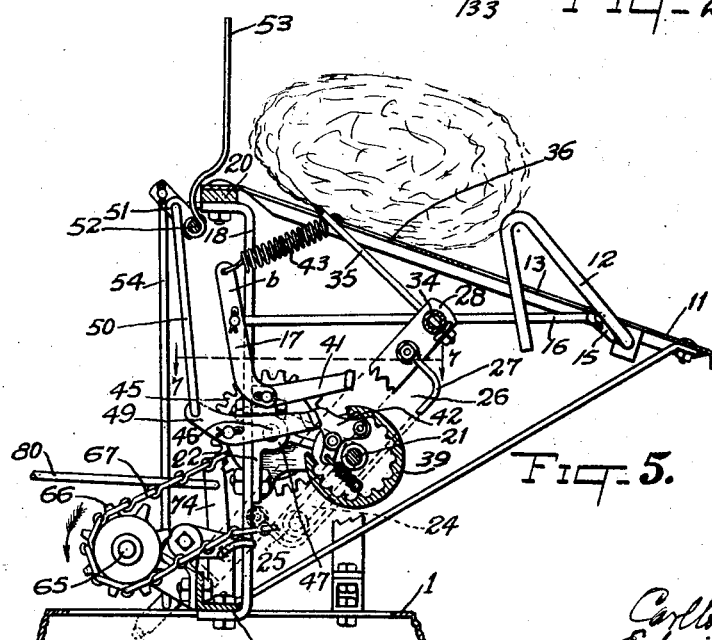

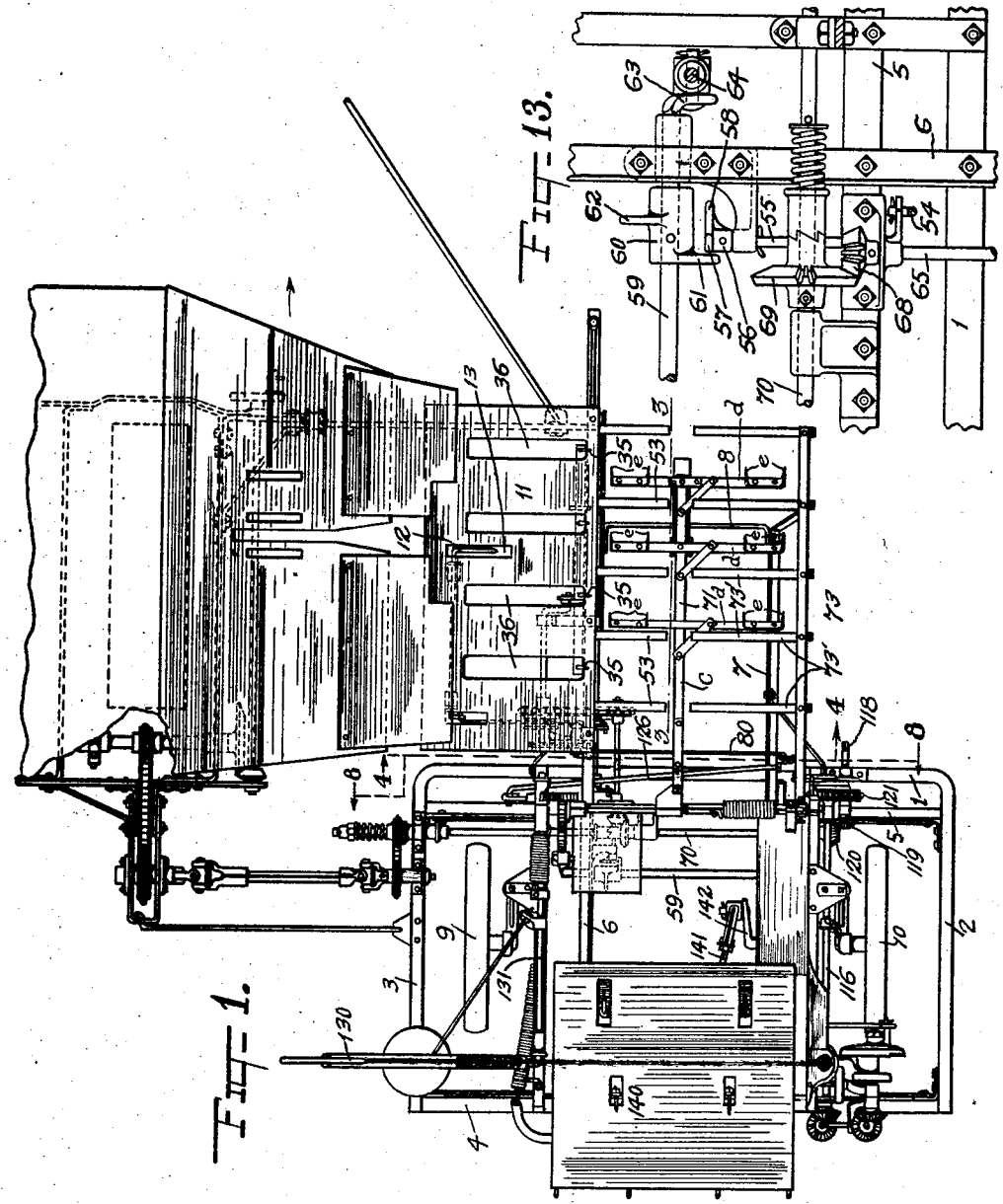

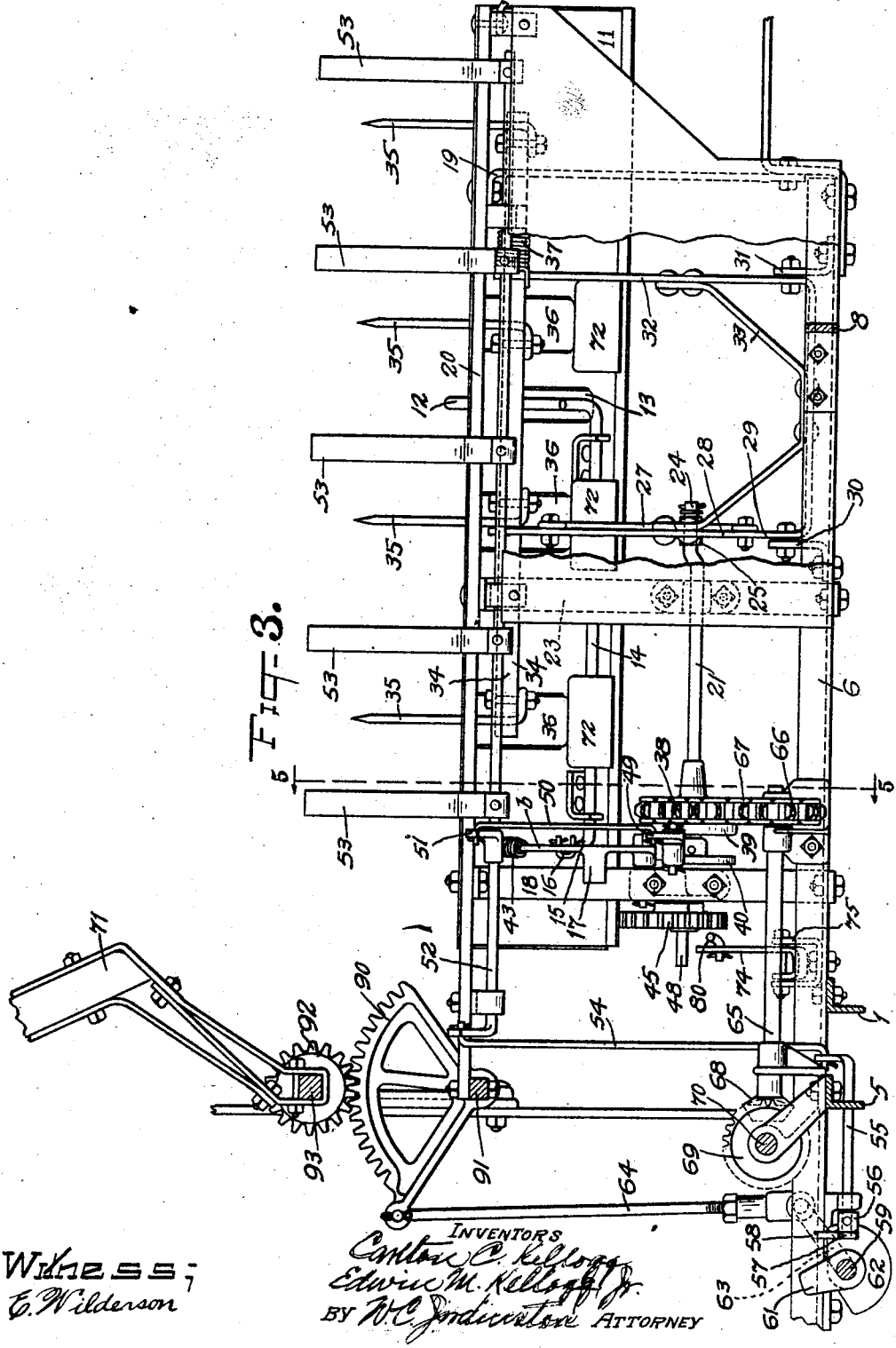

Dec. 13, 1927.
C. C. KELLOGG ET AL
1,652,280
GRAIN SHOCKER
Filed Oct. 22, 1923
7 Sheets-Sheet 4
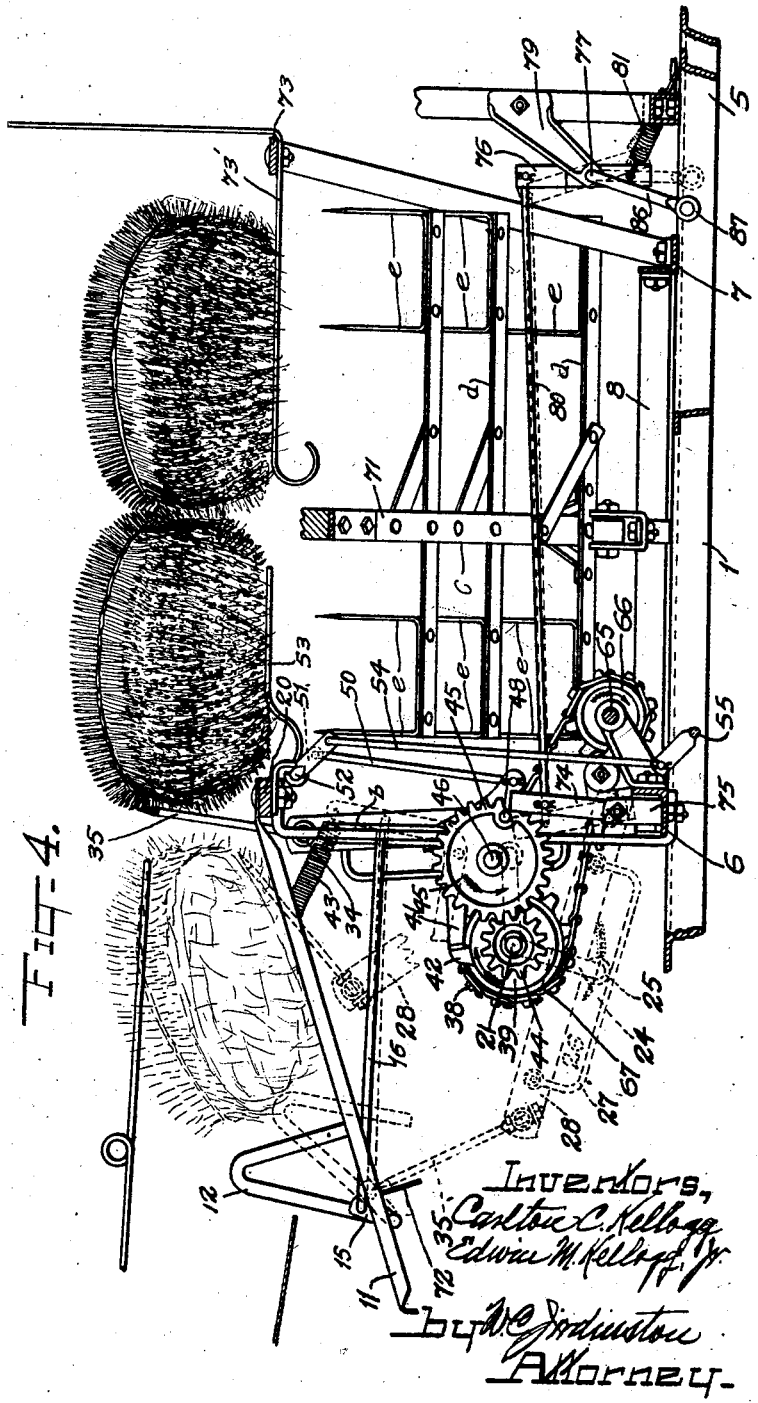

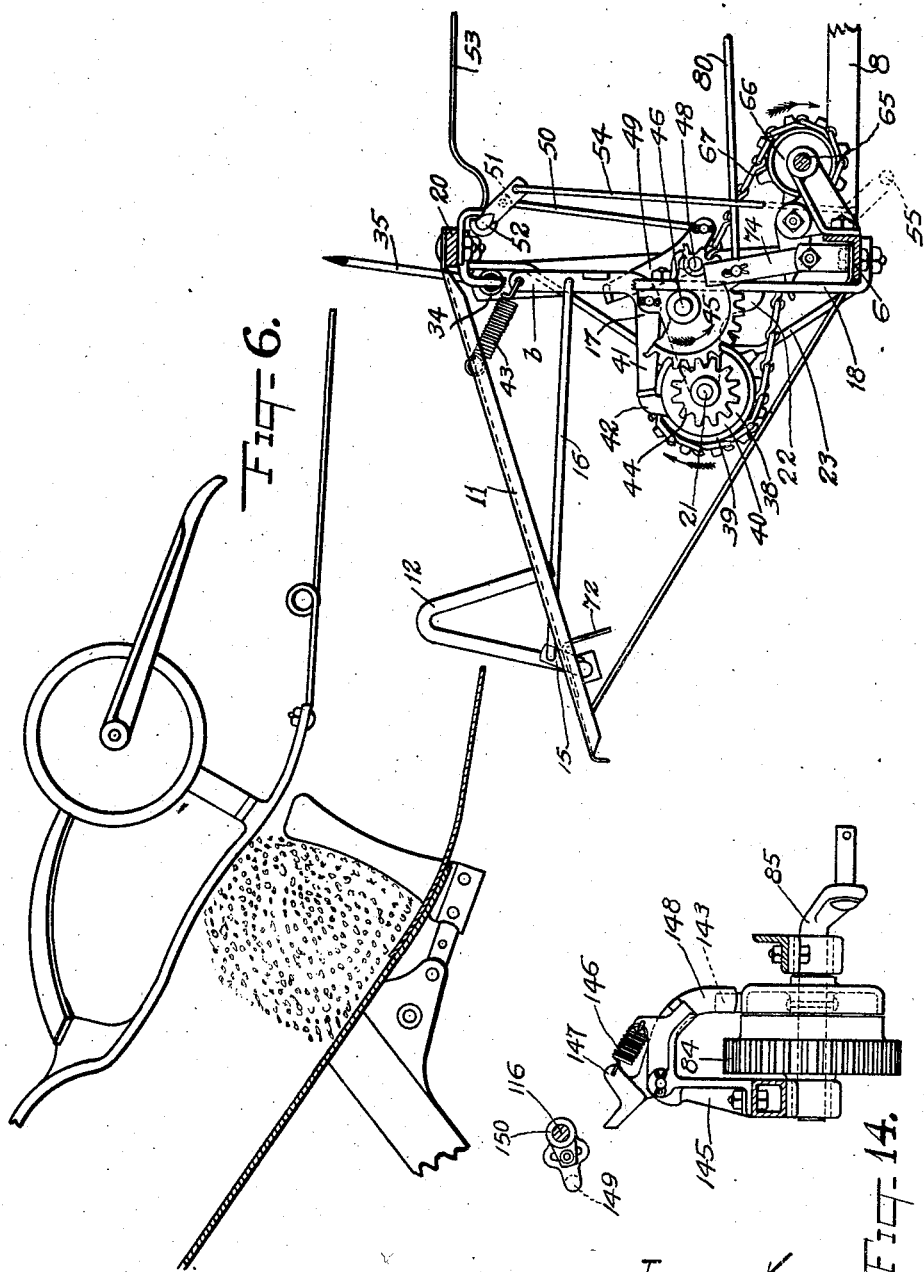

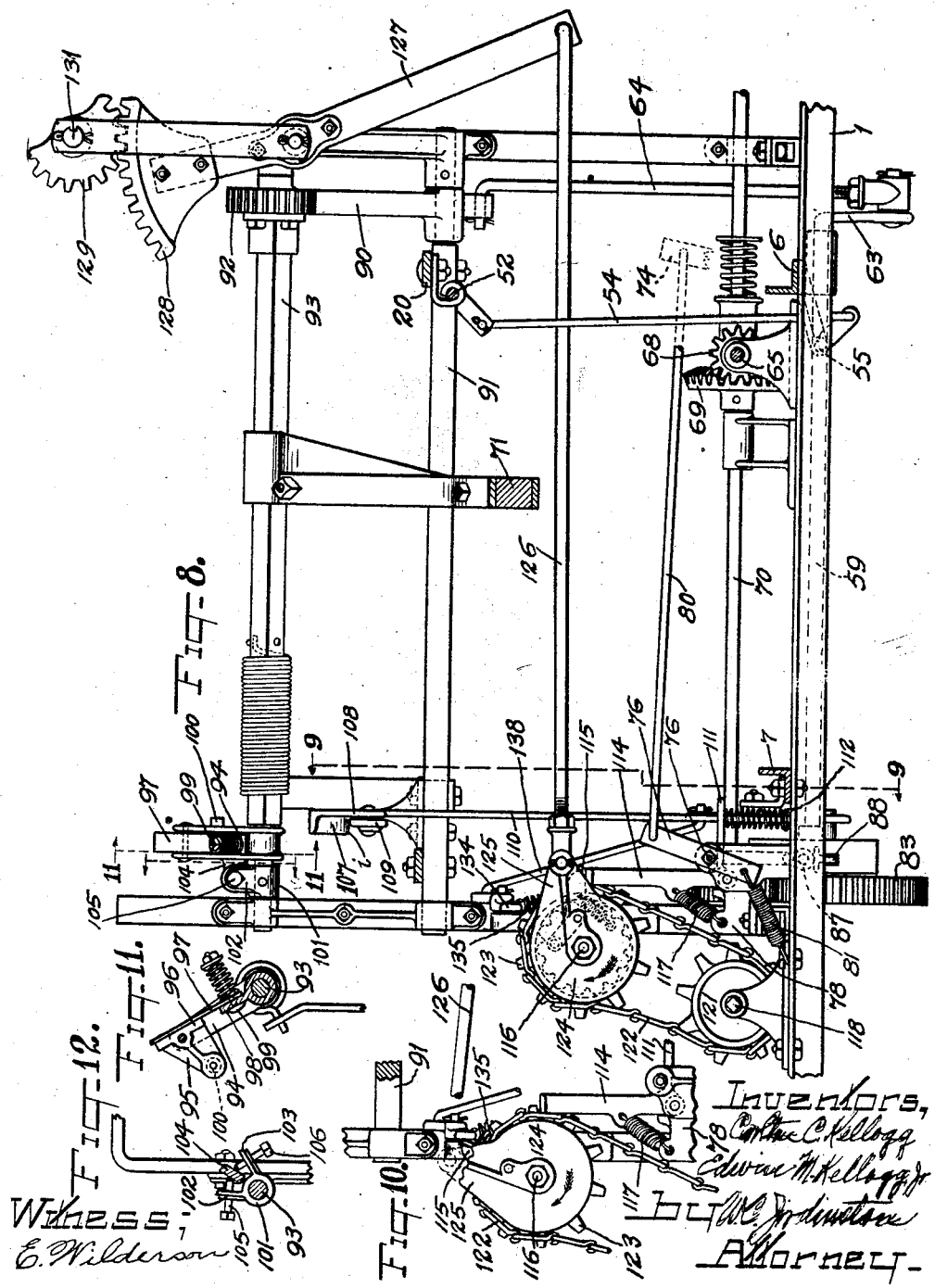

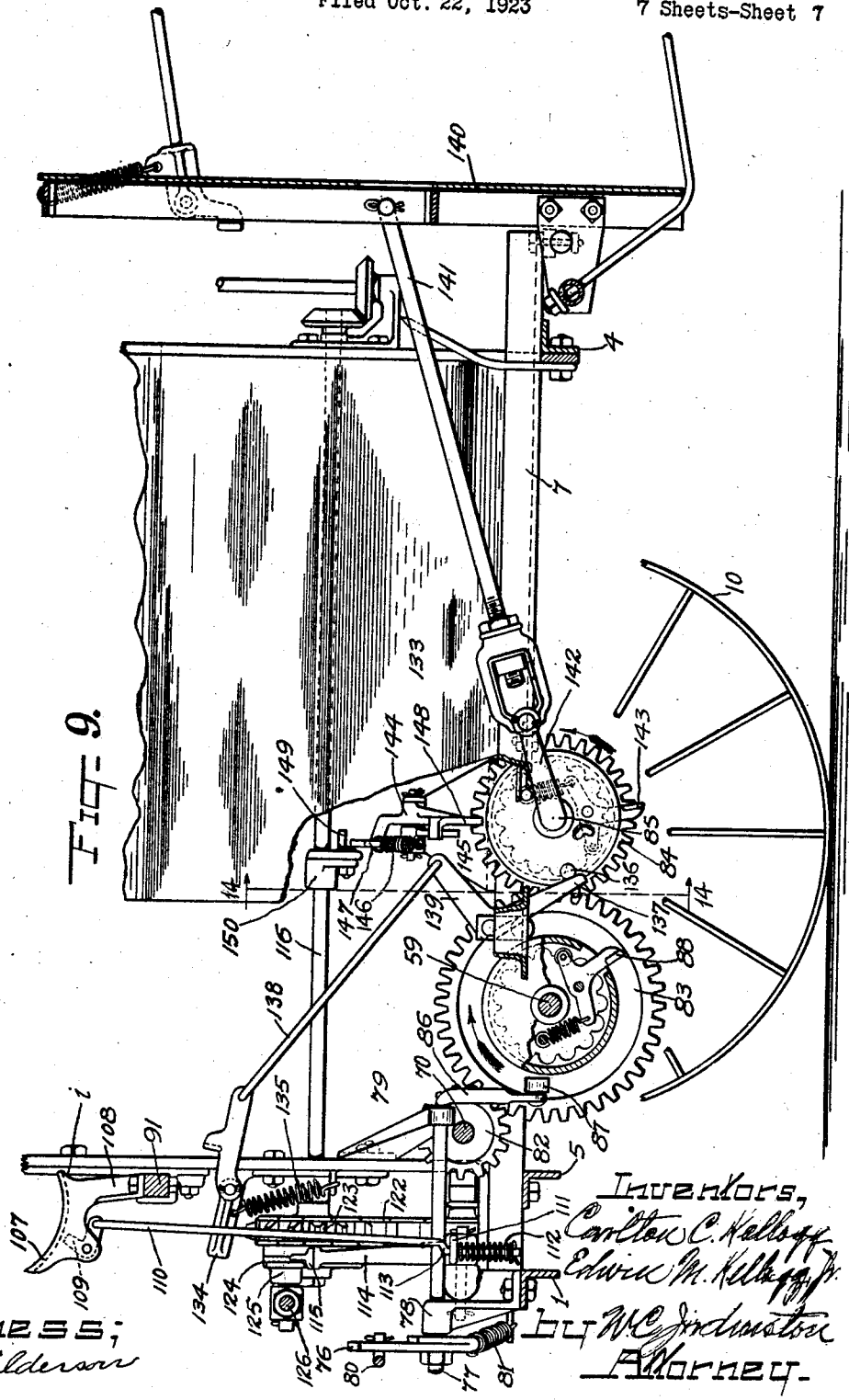

Patented Dec. 13, 1927.

1,652,280

UNITED STATES PATENT OFFICE.

CARLTON C. KELLOGG AND EDWIN M. KELLOGG, JR., OF MOLINE, ILLINOIS.

GRAIN SHOCKER.

Application filed October 22, 1923. Serial No. 669,936.

Our invention relates to harvesters and binders and more particularly to shockers connectible thereto to receive bundles of grain from the harvester, and, through operation of suitable mechanism, form the bundles into a shock and deposit them upon the ground.

As clearly disclosed in the co-pending application of Carlton C. Kellogg, Serial No. 295,730, our invention presents a deck for receiving bundles from the binder, mechanism for moving the bundles over the deck into the path of a reciprocating pronged structure which engages with the bundles and deposits them in a receptacle where they are formed into a shock and bound and discharged from the receptacle onto the ground in a standing position.

The operation of the shocker is continuous with the operation of the harvester and binder, and a rapid delivery of bundles to the deck of the shocker and their transferal to the pronged structure in perfect sequence is provided for by the mechanism co-operating with the deck of the shocker and to which improvements hereinafter disclosed relate as one of the objects of our invention.

A further object of our invention relates to control of the needle of the tying mechanism while a shock is being discharged from the receptacle; other objects are disclosed in the following specification.

Referring to the drawings in which similar numerals indicate identical parts—

Figure 1 is a plan view of our improved shocker attached to a harvester and binder, sufficient of the latter being shown as thought necessary to illustrate the co-operating position of both machines. Figure 2 is a rear view, showing in dotted lines, a shock within the receptacle, tied and about to be discharged. Figure 3 is an enlarged detail longitudinal vertical section on the line 3—3 of Fig. 1, part of the receiving deck of the shocker, and the mechanism for transferring bundles to the pronged structure together with its operating mechanism and connected parts. Figure 4 is an enlarged section on the line 4—4 of Figure 1 viewed from the rear of the shocker, and showing bundles in position to be engaged by the pronged structure. Figure 5 is an enlarged detail section on the line 5—5 of Figure 3 showing the actuating parts of the transfer mechanism, and, in dotted lines, the position of a bundle prior to its transfer into the path of the pronged structure. Figure 6 is a reversed view of the parts shown in Figure 5 and the relative positions of the receiving deck of the shocker and the deck of the harvester and binder. Figure 7 is an enlarged detail plan in part section on the line 7—7 of Figure 5. Figure 8 is a detail section on the line 8—8 of Figure 1 showing parts of the needle operating mechanism. Figure 9 is a detail longitudinal of the shock receptacle with the bottom thereof in dumping position. Figure 10 is a fragmentary view of parts in Figure 8. Figure 11 is a detail section on the line 11—11 of Figure 8. Figure 12 is a detail section on the line 12—12 of Figure 8. Figure 13 is a detail of part of the power transmitting mechanism, and Figure 14 is a detail section on the line 14—14 of Figure 9.

The main frame upon which the shocker is built and operates, includes a beam 1 formed preferably of angle iron and bent to present rearwardly extending portions 2 and 3 to which is rigidly secured a rear cross bar 4 and a forward cross bar 5. A longitudinal beam 6 is secured to the beam 1 and the cross bars 4 and 5 and extends forwardly as a support for the transfer mechanism hereinafter noted. A similar beam 7, parallel to the beam 6, is also secured on the beam 1 and the cross bars 4 and 5, and extending forwardly is connected to the beam 6, at the forward end thereof, by a cross brace 8. The frame is supported on wheels 9 and 10.

As shown in Figure 6 the deck $a$ of the harvester and binder is close to the supplemental deck 11 of the shocker and preferably overlaps the deck 11. Bundles ejected from the harvester and binder onto the supplemental deck 11 contact with an inverted V-shaped tripping member 12 normally extending upward through a slot 13, in the supplemental deck 11, and preferably integral with a rod 14 supported in suitable bearings on the under side of the supplemental deck 11, and extending rearwardly. The rear end of the rod 14 is bent to form a crank 15 to which is pivotally connected a rod 16 extending stubbleward and pivotally attached to an upstanding arm $b$ of a bell crank 17. The bell crank 17 is rockably supported on a standard 18, which is one of the supports of the receiving deck 11; an additional support 19 is provided at the forward part of the supplemental deck 11 and both supports are rigidly secured to the beam 6 and to a bar 20 to which the delivery end of the supplemental deck 11 is attached.

A shaft 21 is journaled in a bearing on a bracket 22 secured on the standard 18, and also in a bearing on a standard 23 bolted to the beam 6 and the bar 20. A crank arm 24, on the forward end of the shaft 21, carries a roller 25 operating in a guideway 26 formed by a rod 27 both ends of which are bent and rigidly connected to one arm 28 of an armed structure 29 pivotally supported on brackets 30 and 31 on the beam 6. An opposite arm 32 of the member 29 is parallel to the arm 28, and a brace 33 reinforces both arms. A tubular bar 34 is rockably journaled in the upper portions of the arms 28 and 32, and mounted thereon is a series of prongs 35 which normally extend upwardly through slots 36 in the supplemental deck 11. A spring 37 is coiled around the bar 34 and is attached thereto and to the arm 32, whereby the prongs are normally held in alinement with the arms 27 and 32 of the member 29 but are capable of yielding under conditions hereinafter explained.

Loosely journaled on the shaft 21 is a sprocket 38 having integral therewith part 39 of a clutch which is in engagement with a second part 40, rigid on the shaft 21, during the operation of transferring bundles across the supplemental deck 11, but at other times the two parts of the clutch are held out of engagement by the arm 41 of the bell crank 17 contacting with a dog 42, pivoted on one part of the clutch, and retained in contact by a coiled spring 43 attached to the free end of the arm $b$ of the bell crank 17 and to the supplemental deck 11. On the rear termination of the shaft 21 is a pinion 44 in mesh with a gear 45 secured on a stub shaft 46, supported in a bearing 47 on the bracket 22, and having a stud or pin 48 projecting from its rear side.

Pivotally supported, intermediate of its ends, on a rearward extension of the bracket 22, is an arm 49 adapted to contact with the dog 42, and attached to its opposite end is a link 50 extending upwardly to connection with an arm 51, rigid on a shaft 52 journaled to rock in bearings on the bar 20; the shaft 52 carries a series of fingers 53 which operate as a part of the receiving deck prior to the deposit of bundles in the shock receptacle, and also act as a gate while such deposit is being made. The rear end of the shaft 52 is bent and to its extremity is attached a link 54 extending downwardly to connection with the crank end of a shaft 55 journaled in bearings on the main frame; the opposite end of the shaft 55 carries, rigid therewith, a member 56 having radial arms 57 and 58 substantially at a right angle to each other.

A shaft 59 is supported in suitable bearings on the main frame and rigidly mounted thereon is a sleeve 60 having a finger 61 adapted to contact, at a predetermined interval, with the radial arm 57 of the member 56. A cam 62 extends from the sleeve 60, for substantially the greater part of the circumference thereof, and is adapted to contact with the radial arm 58 to rock the shaft 55. A crank arm 63 is formed on the grainward end of the shaft 59 and operates the pitman 64 connected therewith and with the actuating mechanism of the pronged structure which deposits bundles in the shock receptacle.

Supported in bearings on the beam 6 and cross bar 5 respectively is a shaft 65 having a sprocket 66 on its forward end over which leads a chain 67 to the sprocket 38; the rearward end of the shaft 65 carries rigidly therewith a beveled pinion 68 in mesh with a beveled gear 69 rigid on a shaft 70, which is supported transversely of the main frame and to which power is transmitted from the bull wheel of the harvester to actuate the mechanism of the shocker.

The mechanism just described operates to transfer bundles received from the binder deck of the harvester and to place them successively, one at a time, on a receiving deck within the path of the pronged structure to be delivered by the latter to the shock former or receptacle. The pronged structure operates when two bundles have been transferred to the receiving deck, and we have found that in transferring bundles, one at a time, to the receiving deck they are deposited thereon in more perfect alinement than if they were delivered to the receiving deck two at a time.

In the operation of the described parts it will be understood that the power shaft 70 and the shaft 65 are continuously rotating, when the harvester and shocker are in use. When a bundle is ejected from the harvester, the impetus rocks the trip member 12 and by the connection thereof, through the rod 16, to the bell crank 17 the latter is actuated to free the dog 42 and then operates to rotate the shaft 21 by power from the shaft 65 by the chain 67 and a sprocket on the shaft 65 and a similar sprocket on the shaft 21. As the shaft 21 is rotated, the crank arm 24 operating in the guideway 26 of the member 29 rocks the latter, and at the limit of its movement the prongs 35 are in contact with plates 72 below the plane of the deck 11, as shown in Figure 4. Continued rotation of the shaft 21 rocks the member 29 upwardly and the prongs 35 entering the slots 36 rearward of the bundle transfer it over the supplemental deck to the receiving deck composed of the gate and a bar 73 having fingers 73' in alinement with the fingers of the gate and is fixed rigidly in position, the gate being always down until raised by the upward movement of the pronged structure 71.

When the tripping member 12 is free from the bundle passing over it it is returned to its primal position by action of the spring 43, connected to the under side of the deck 11 and the bell crank 17, and simultaneously the arm 41 of the bell crank is lowered into the path of the dog 42 and when in contact therewith the clutch is opened until a second bundle passes over the tripping member; two bundles are now on the receiving deck in position for delivery to the shock receptacle, the pressure of the second bundle having moved the first bundle to the opposite side of the receiving deck.

The pinion 44 and the gear 45 are in the ratio of 1 to 2; consequently, the gear 45 makes a complete revolution during the transfer of two bundles to the receiving deck, and as the second bundle is transferred the pin 48, on the gear 45 contacts with and rocks an arm 74 pivotally mounted on a bracket 75 on the frame bar 6. A similar arm 76 is rigidly secured intermediate its length, on a rock shaft 77 journaled in bearings on brackets 78 and 79 secured on the stubbleward side of the frame, the two arms rocking simultaneously through a rod connection 80. On completion of the revolution of the gear 45 the pin 48 has released the arms 74 and 76 which are returned to their primal position, as shown in dotted lines in Figure 4, by a coiled spring 81 attached to the lower end of the arm 76 and to the frame.

A pinion 82 is rigidly secured on the power shaft 70 and is in constant mesh with a gear 83 loosely mounted on the shaft 59 and which meshes with a gear 84 loosely mounted on a shaft 85 journaled in suitable bearings on the frame bar 7. Simultaneously with the transfer of the second bundle to the receiving deck over the pronged structure 71, motion is imparted to the arm 76 by the pin 48 rocking the arm 74; as the arm 76 is rigidly secured on the shaft 77 the latter rocks with the arm 76 and swings a crank arm 86, integral with the shaft 77, away from the gear 83. The crank arm 86 carries a roller 87 against which the dog 88 of a well known type of clutch contacts to separate the clutch and hold the shaft 59 inactive. Rocking the shaft 77 and swinging the crank arm breaks the contact of the clutch dog 88 with the roller 87 and the gear 83, which is in constant rotation, is connected, by operation of the clutch, to the shaft 59, the dog of the clutch passing the roller which again is in position to contact with the clutch dog by tension of the spring 81 when the shaft 59 has made a complete revolution.

The opposite end of the shaft 59 is a crank arm 63 to which the pitman 64 is pivotally connected, the upper end of the pitman being attached to a segmental rack 90 secured on rigid shaft 91 supported in suitable bearings on the main frame of the shocker. A pinion 92 is rigidly mounted on a shaft 93 mounted in suitable bearings on the main frame and meshes with the segmental rack 90. The pronged structure 71 is secured on the shaft 93, and it is evident that when the shaft 59 is rotated the pronged structure is operated by the pitman 64 rocking the segmental rack 90 and, through the pinion 92, rotating the shaft 93 on which the pronged structure is mounted. The pronged structure 71 comprises the arm c to which is secured transverse bars d having vertical prongs e rigidly attached adjacent their respective ends. The normal position of the structure is with a forwardly declination below the shocker deck, sufficient space intervening to permit the structure to attain that degree of impetus, as it is swung upwardly, to cause the prongs to penetrate the bundles and carry them rearwardly to the shop receptacle. We do not limit ourselves to the form of structure shown, as it is well known in the art and capable of variation. As the pronged structure removes the bundles from the receiving deck to deposit them in the shock receptacle or former, the gate, comprising the rock shaft 52 and the fingers 53, which is part of the receiving deck, is raised to a vertical position by operation of the shaft 59 which, as it rotates, rocks the shaft 55, by action of the cam 62 against the arm 58, and thereby rocks the shaft 52 to raise the fingers 53 to a vertical position through the connection of the link 54 to the crank ends of the shafts 52 and 55. The gate is held in raised position by contact of the cam 62 with the arm 58 which contact endures until the pronged structure passes the gate on its way back to a receiving position, at this time the cam 62 is released from contact with the arm 58, and the finger 61, contacting with the arm 57, rocks the shaft 55 and the gate is lowered to again become part of the receiving deck of the shocker, the dog 88 is now released from contact with the roller 87 so that the clutch is broken and the shaft 59 is again inactive until two more bundles are ready to be deposited in the shock receptacle, and the action of the parts just described will be repeated.

In a heavy harvest it is possible that a bundle will be ejected from the binder onto the supplemental deck before the pronged structure has returned to its receiving position, the gate is raised however and a third bundle cannot be moved into the path of the pronged structure until the gate is down, but such a bundle ejected from the binder onto the supplemental deck will trip the transfer mechanism into operation, releasing the dog 42 so that the shaft 21 will be rotated to actuate the transfer mechanism with possible damage thereto as the grate is in a raised position and must remain so until the pronged structure returns to its receiving position. The gate is raised, as heretofore explained, and as it rises the arm 49 is rocked through the link 50 which is connected thereto and to the arm 51 rigid on the shaft 52. The free end of the arm 49 is now in the path of the dog 42, consequently if a bundle should rock the tripping member 12 and free the dog by rocking the bell crank 17, before the armed structure could operate to transfer the bundle against the gate, the dog would be caught by the arm 49 and the transfer blocked, the parts then being in the position as shown in Figure 5. It is obvious that when the gate is lowered the arm 49 is rocked to free the end thereof from the dog 42 of the clutch so that the interrupted transfer of the bundle will be completed; the armed structure has been stopped within the limits of its path of travel toward the receiving end of the supplemental deck 11, but we do not limit ourselves to the particular position of the armed structure as shown in Figure 5 and described, for it is obvious that a slight change in the location of the arm 49 will permit the armed structure to swing to the limit of its path toward the binder.

The stubbleward end of the shaft 93 is round and on it is loosely mounted a bifurcated member 94 between the arms of which is pivotally secured a block 95 having a flat base 96 against which a flat spring 97 presses; the opposite end of the flat spring 97 is yieldingly attached to a short web 98 by a bolt in said web and extended through the spring 97, on the free end of the bolt is a nut, and between the nut and the flat spring 97 a coiled spring is carried on the bolt. On the block 95 opposite the base 96, is mounted a roller 100. To hold the member 94 and attached parts in operative position a sleeve 101 is rigidly secured on the shaft 93 and from it radial arms 102, 103 extend on opposite sides respectively of a projection 104 integral with a side of the member 94. A set screw 105 in the arm 102 adjustably contacts with a side of the projection 104 and a similar set screw 106 in the arm 103 adjustably contacts with the opposite side of the projection 104. The mechanism just described is interposed between the pronged structure and the tying mechanism and is actuated each time the pronged structure deposits bundles in the shock receptacle until sufficient bundles have accumulated to form a shock, and its operation is as follows—

As the shaft 93 rotates carrying with it the member 94 and connected parts the roller 100 engages at $i$ with the underside of an arcuate flange 107 integral with a casting 108 rigid on the rigid shaft 91; the movements of these parts is so timed that when the pronged structure is at the limit of its movement depositing bundles in the receptacle, the roller 100 has traversed the length of the flange 107 and has emerged from the underside thereof and travels over the upper surface of the flange 107 as the pronged structure returns to its receptive position and the parts above described are again as shown. When bundles have accumulated in the receptacle to the extent that the last two deposited there will prevent the pronged structure from swinging as far downward into the shock receptacle, as when delivering previous bundles, the pronged structure must have sufficient resiliency to compensate for its down pressure, and when this condition is reached the member 94 will fail to make a complete swing and the roller 100, instead of returning along the upper surface of the arcuate flange, will return along the under surface thereof and contact with and rock a bell crank 109, mounted on the casting 108; as the bell crank 109 is actuated it moves longitudinally and downward a rod 110 which is attached to one arm of the bell crank and to a horizontal part 111 of a rockable trip which is pivotally supported on the bracket 78.

The rod 110 projects through a suitable opening in the part 111 and below the latter is encircled by a coiled spring 112 which exerts expansive force between the part 111 and a washer on the end of the rod. The spring 112 retains the bell crank 109 in operative position and the shoulder or bend 113, in the rod, in contact with the part 111. The free end of the vertical arm 114 of the trip is adapted to contact with a clutch dog 115 forming part of a clutch mechanism on a shaft 116 of the tying device. The arm 114 is in contact with the dog 115 and is held so by a spring 117 attached to the bracket 78 and to the arm 114, until by the movement of the rod 110 the arm 114 is rocked from engagement with the dog 115.

A short shaft is journaled in suitable bearings on the frame and carries, rigidly secured thereon, a bevel gear 119 meshing with a similar gear 120 on the power shaft 70; a sprocket 121 is secured on the shaft 118, and a chain 122 conveys power therefrom to a sprocket 123 which is loosely mounted on the shaft 116. The sprocket 123 is part of a clutch the second part 124 of which is rigidly secured on the shaft 116 and has an extension 125 pivotally connected by a rod 126 that is also attached to the lower end of a rocking bar 127; the bar 127 is pivotally mounted, intermediate its length, on the shocker frame, and to its upper end is rigidly secured a segmental rack 128 in mesh with a segmental pinion 129 secured on the needle shaft 131. It is apparent that when the dog 115 and the arm 114 are released from contact with each other, the parts of the clutch will rotate together and through the rod 126 and the bar 127 the segmental rack 128 will actuate the segmental pinion 129 to operate the needle 130 by rotating the shaft 131.

When the shock has been formed and tied and the needle 130 has been returned to its primary position, as shown in dotted lines in Figure 2, it has been found necessary to provide some means for lifting the twine 132 so that it will not be in the path of discharge of the shock from the receptacle 133; various devices have been employed for this purpose, but we have found that by stopping the needle before it has completed its return movement from the knotter and when it is substantially in a vertical position, there is sufficient clearance between the twine and the shock, and we stop the needle in the following manner: When the arm 114 and the dog 115 are separated, the part 124 rotates with the sprocket 123 until the dog contacts with a stop 134 pivotally supported intermediate its length on the shocker frame, and normally held in the path of the dog 115 by a coiled spring 135. Upon the contact of the dog and the stop, the clutch is separated and the return motion of the needle 130 is arrested, and it remains in the position as shown in full lines in Figure 2 until the stop 134 is removed from the path of the dog 115 after which the part 124 continues its rotation until the dog 115 and arm 114 are again in contact and the needle and attached twine are in the position shown in dotted lines in Figure 2.

As before stated, the pinion 82, gear 83 and gear 84 are in constant rotation during the operation of the shocker, and each of the gears 83 and 84 carry part of a clutch which rotates with the gears and are connected to their respective shafts by engagement of second parts of clutches which are actuated by suitable dogs. Referring to Figure 9 in which the gears 83 and 84 and their respective shafts are rotating, a pin 136, rotating with the gear 84, when the clutch is connected, and operating against one arm 137 of a bell crank, pivotally supported on the shocker frame, rocks the bell crank and by a rod 138 connecting the arm 139 of the bell crank with the stop 134, the latter is rocked to free it from the dog 115 and when the latter has passed on and the pin 136 is free of contact with the arm 137, the stop 134 is again moved into the pathway of the dog 115.

The bottom 140 of the shock receptacle 133 has been rocked upward and rearward to dump the shock by a pitman 141 which is attached to the bottom 140 and to a crank arm 142 on the shaft 85, and as the gear 84 and the shaft 85 continue their movement, the bottom 140 is returned to its receptive position, and the dog 143 meeting the stop 144, the shaft 85 ceases its rotation and the bottom 140 remains in a receptive position until again actuated. The stop 144 is pivotally mounted, intermediate its ends, on a bracket 145 on the shocker frame, and by tension of a coiled spring 146, attached to the bracket and an arm 147 of the stop, the part 148 of the latter is held in the path of the dog 143, and is rocked therefrom by contact of a pin 149 secured in a casting 150 rigidly held on the shaft 116 and rotatable therewith.

What we claim is—

1. The combination of a harvester binder having means for discharging bundles from the deck thereof; a shocker having a deck for receiving bundles from the binder deck; a supplemental deck secured on the shocker between the receiving deck and the binder deck to support bundles transferred from the binder deck to the receiving deck; a reciprocating element mounted on the shocker beneath the supplemental deck and operated to transfer bundles thereover to the receiving deck of the shocker; and mechanism to actuate said element.

2. The combination of a harvester binder having means for discharging bundles therefrom; a shocker having a receptacle for bundles to form a shock; a pronged structure to receive bundles from the binder; mechanism to actuate said pronged structure to deposit bundles in said receptacle; a reciprocating element mounted on the shocker and operated to transfer bundles from the binder into the path of said pronged structure; and mechanism to actuate said element.

3. The combination of a harvester binder having means for discharging bundles from the deck thereof; a shocker having a deck to receive bundles from the binder deck; a supplemental deck between the binder deck and the receiving deck; a reciprocating element comprising one or more arms pivotally mounted on the shocker beneath the supplemental deck; slots in the supplemental deck; prongs on said arms extending through said slots and engageable with bundles discharged from the binder deck; and mechanism to actuate said arms to transfer bundles from the supplemental deck to the receiving deck.

4. The combination of a harvester binder having means for discharging bundles from the deck thereof; a shocker having a deck to receive bundles from the binder deck; a supplemental deck between the binder deck and the receiving deck; slots in the supplemental deck; a reciprocating pronged element pivotally supported on the shocker beneath the supplemental deck and operating through said slots to transfer bundles to the receiving deck; and mechanism to actuate said element.

5. The combination of a harvester binder having means for discharging bundles therefrom; a shocker having a receptacle for bundles discharged from the binder; a pronged structure to receive bundles discharged from the binder, and mechanism to actuate said pronged structure to deposit bundles in said receptacle to form a shock; a reciprocating element operating to transfer bundles from the binder into the path of said pronged structure; and means to hold said element inoperative intermediate the limits of its reciprocating action when said pronged structure is in operation.

6. The combination of a harvester binder having means for discharging bundles therefrom; a shocker having a receptacle for bundles discharged from the binder; a pronged structure to receive bundles discharged from the binder, and mechanism to actuate said pronged structure to deposit bundles in said receptacle to form a shock; a reciprocating element operated to transfer bundles from the binder to said pronged structure; and means to hold said element inoperative at a predetermined point within the limit of its reciprocating movement when said pronged structure is in operation.

7. The combination of a harvester binder having means for discharging bundles from the deck thereof; a shocker having a deck for receiving bundles from the binder deck; a supplemental deck between the receiving deck and the binder deck to receive bundles from the binder deck; a reciprocating element operated to transfer bundles over the supplemental deck to the receiving deck; a shock forming receptacle; a pronged structure to engage bundles on the receiving deck; a mechanism to actuate said pronged structure to deposit bundles in said receptacle to form a shock; and means to hold said element inoperative intermediate the limits of its reciprocating action when said pronged structure is in operation.

8. The combination of a harvester binder having means for discharging bundles from the deck thereof; a shocker having a receptacle to receive the bundles to form a shock; a receiving deck on the shocker; a pronged structure operating to transfer the bundles from the receiving deck to said receptacle; a supplemental deck between the binder deck and the receiving deck to receive bundles discharged from the binder deck; a rocking element movable toward the binder deck to engage with bundles discharged therefrom, and movable toward the receiving deck to deposit said bundles thereon; and means to hold said element inoperative at a predetermined point between the binder deck and the receiving deck other than its normal position.

9. The combination of a harvester binder having means for discharging bundles from the deck thereof; a shocker having a receptacle to receive the bundles to form a shock; a receiving deck on the shocker; a pronged structure operating to transfer the bundles from the receiving deck to said receptacle; a supplemental deck between the binder deck and the receiving deck to receive bundles discharged from the binder deck; a rocking element movable toward the binder deck to engage with bundles discharged therefrom, and movable toward the receiving deck to deposit said bundles thereon; and means to hold said element inoperative at a predetermined point within the limit of its movement toward the binder deck.

10. The combination of a harvester binder having means for discharging bundles therefrom; a shocker having a receptacle in which the bundles are deposited to form a shock; devices operable to transfer bundles from the binder to said receptacle; a tying mechanism including a needle operating transversely of said receptacle to tie the bundles therein in a shock and to return towards its primal position when the shock is tied; means to discharge the shock from said receptacle; and means to hold the needle at a predetermined point within the limits of its return movement during the operation of discharging the shock.

11. The combination of a harvester binder having means for discharging bundles therefrom; a shocker having a receptacle in which the bundles are deposited to form a shock; devices operable to transfer bundles from the binder to said receptacle; a tying mechanism including a needle operating transversely of said receptacle to tie the bundles therein in a shock and to return towards its primal position when the shock is tied; means to discharge the shock from said receptacle; and means to hold the needle in a vertical position at a predetermined point within the limits of its return movement during the operation of discharging the shock.

12. The combination of a harvester binder having means for discharging bundles therefrom; a shocker having a receptacle in which the bundles are deposited to form a shock; devices operable to transfer bundles from the binder to said receptacle; a tying mechanism including a needle operating transversely of said receptacle to tie the bundles therein in a shock and to return towards its primal position when the shock is tied; means to discharge the shock from said receptacle; means to hold the needle in a vertical position at a predetermined point within the limits of its return movement during the operation of discharging the shock; and means to release the needle to complete its return movement when the shock is discharged.

CARLTON C. KELLOGG.
EDWIN M. KELLOGG, Jr.